United States Patent
Hoshino et al.

(10) Patent No.: US 7,825,964 B2
(45) Date of Patent: Nov. 2, 2010

(54) METHOD OF PROCESSING NOISE IN IMAGE DATA, NOISE REDUCTION UNIT, AND IMAGING APPARATUS

(75) Inventors: Kazuhiro Hoshino, Kanagawa (JP); Hirofumi Sumi, Kanagawa (JP)

(73) Assignee: Sony Corporation, Tokyo (JP)

( * ) Notice: Subject to any disclaimer, the term of this patent is extended or adjusted under 35 U.S.C. 154(b) by 510 days.

(21) Appl. No.: 11/895,528

(22) Filed: Aug. 24, 2007

(65) Prior Publication Data

US 2008/0079827 A1    Apr. 3, 2008

(30) Foreign Application Priority Data

Sep. 28, 2006 (JP) .......................... P2006-264293

(51) Int. Cl.
H04N 5/228 (2006.01)
H04N 5/217 (2006.01)
G06K 9/40 (2006.01)
G06K 9/36 (2006.01)
G06K 9/64 (2006.01)

(52) U.S. Cl. .................... 348/241; 348/222.1; 382/275; 382/278; 382/279

(58) Field of Classification Search ................ 348/241, 348/248, 222.1; 382/275, 278, 279
See application file for complete search history.

(56) References Cited

U.S. PATENT DOCUMENTS 7,587,099 B2 * 9/2009 Szeliski et al. .............. 382/275

2003/0194110 A1 * 10/2003 Brodsky ...................... 382/103
2008/0144958 A1 * 6/2008 Lee ............................. 382/260

FOREIGN PATENT DOCUMENTS

JP    2002-135623    5/2002
JP    2006-148550    6/2006

OTHER PUBLICATIONS

"Fundamentals of Solid-State Imaging Devices", pp. 81-84, Nippon Rikoh Publishing Society.
Base of solid-state image sensor.

* cited by examiner

*Primary Examiner*—Lin Ye
*Assistant Examiner*—Chia-Wei A Chen
(74) *Attorney, Agent, or Firm*—Robert J. Depke; Rockey, Depke & Lyons, LLC

(57) ABSTRACT

A method of processing noise in image data by an image processor having a signal-processing portion converting an image signal from an image sensor into a digital signal and outputting the converted signal as image data for each frame, the image data indicating sets of pixel values each having a brightness at a corresponding one of coordinate points arranged in directions of rows and columns is disclosed. The method includes the steps of: extracting pixel values; deciding pixel value; finding autocorrelation coefficients of pixel values which are less than a first threshold value; and deciding random noise in the image.

34 Claims, 7 Drawing Sheets

PRIOR TO PROCESSING

AFTER PROCESSING

METHOD OF PROCESSING NOISE IN IMAGE DATA, NOISE REDUCTION UNIT, AND IMAGING APPARATUS

CROSS REFERENCE TO RELATED APPLICATION

The present invention contains subject matter related to Japanese Patent Application JP 2006-264293 filed in the Japanese Patent Office on Sep. 28, 2006, the entire contents of which being incorporated herein by reference.

BACKGROUND OF THE INVENTION

1. Field of the Invention

The present invention relates to a method of processing noise in image data such that at least one of judgment of noise produced at random in time by an imaging device such as a CCD image sensor or CMOS image sensor and reduction of the random noise is enabled. The invention also relates to a noise reduction unit and to an imaging apparatus using the noise reduction unit.

2. Description of the Related Art

In an imaging apparatus (such as a digital camera capable of imaging motion pictures with a solid-state imaging device (e.g., a CCD image sensor or CMOS image sensor)), a camera built in a cell phone, or a digital camera, it is important to reduce noise produced by the solid-state imaging device under low luminance conditions during shooting in order to achieve high image quality.

Noises generated by solid-state imaging devices are generally classified into fixed pattern noise and random noise. It is common practice to suppress fixed pattern noise with a correlated double sampling (CDS) circuit (see "Fundamentals of Solid-State Imaging Devices", pp. 81-84, Nippon-Rikoh Publishing Society, Japan (non-patent reference 1)). Meanwhile, random noise is produced at random on the time axis and, therefore, it is difficult to suppress the random noise. However, reduction of random noise is important in preventing deterioration of S/N of the solid-state imaging device and in eliminating the detection limit under low luminance conditions, as well as in achieving high image quality.

Where noise is reduced by an autocorrelation method, when periodic flicker noise, fixed pattern noise, or beat noise is produced in the image, it is possible to capture the pattern (feature) of the noise by calculating the autocorrelation coefficient from the image data. In this case, the autocorrelation function is calculated by $$r(\tau) = \frac{1}{N} \sum_{t=0}^{N-\tau-1} x(t+\tau) x(t) \quad (1)$$

where N is the total number of pixels, x is the pixel value indicating the brightness of the pixel, t is time, and τ is the amount of shift of the pixel along the time axis. The autocorrelation function r(τ) is the arithmetic mean of values of the product of the pixel value at instant of time t and the pixel value at an instant (t+τ) shifted by τ.

SUMMARY OF THE INVENTION

FIG. 8 shows a profile obtained when white noise that is random noise is superimposed on an original signal having a periodicity, for example, given by cos (Π/128). The profile shows that pixel values at various sampling points are not uniform. FIG. 9 shows degrees of autocorrelation produced when white noise has been removed by an autocorrelation technique.

That is, as shown in FIG. 8, when it is random noise made of the original signal having periodicity on which white noise has been superimposed, noise can be removed from variations in the autocorrelation coefficient as can be seen from FIG. 9.

On the other hand, the profile of the white noise having no periodicity such as cos (Π/128) is made of only random noise as shown in FIG. 10. The output result of the autocorrelation function is as shown in FIG. 11. As is obvious from FIG. 11, the correlation coefficient is kept around zero in a signal having no periodicity and so any noise pattern may not be detected. Consequently, noise cancellation may not be made.

More specifically, with respect to a signal having periodicity such as fixed pattern noise, noise reduction can be accomplished by an autocorrelation method. With respect to random noise, noise suppression may not be achieved because the noise has no periodicity.

In view of the foregoing problem, it is desirable to provide a method of processing noise contained in image data in such a way that detection of random noise generated by a solid-state image sensor (solid-state imaging device) is facilitated and that reduction of random noise is also facilitated. It is also desirable to provide a noise reduction unit adapted for implementation of this method. Furthermore, it is desirable to provide an imaging apparatus using the noise reduction unit.

According to one embodiment of the present invention, there is provided a method of processing noise in image data by an image processor having a signal-processing portion converting an image signal from an image sensor into a digital signal and outputting the converted signal as image data for each frame, the image data indicating sets of pixel values each having a brightness at a corresponding one of coordinate points arranged in directions of rows and columns. The method includes the steps of: extracting pixel values by accepting each frame of the image data delivered from the signal-processing portion in turn while shifting the image data at regular intervals of time in a direction of a time axis and extracting, in each frame, pixel values represented by the image data accepted for each frame; deciding pixel values by comparing each pixel value extracted by the pixel values extracting step against a previously set first threshold value and making a decision as to whether the pixel value is less than the first threshold value; finding autocorrelation coefficients of pixel values which are less than the first threshold value and which are possessed by pixels located at the same coordinate point defined by the sets of image data over plural ones of the frames accepted while being shifted at the regular intervals of time; and deciding random noise in the image by making a decision as to whether the autocorrelation coefficients found in the autocorrelation coefficients finding step are less than a previously set second threshold value and determining that the image data has suffered from deterioration of image quality due to random noise when the autocorrelation coefficients are less than the second threshold value.

According to another embodiment of the present invention, there is provided a method of processing noise in image data by an image processor having a signal-processing portion for converting an image signal from an image sensor into a digital signal and outputting the converted signal as image data for each frame, the image data indicating sets of pixel values each having a brightness at a corresponding one of coordinate points arranged in directions of rows and columns. The method includes the steps of: extracting pixel values by accepting each frame of the image data delivered from the signal-processing portion in turn while shifting the image data at regular intervals of time in a direction of a time axis and extracting, for each frame, pixel values represented by the image data accepted for each frame; deciding pixel values by comparing each pixel value extracted by the pixel values extracting step against a previously set first threshold value and making a decision as to whether the pixel value is less than the first threshold value; finding first autocorrelation coefficients of pixel values which are less than the first threshold value and which are possessed by pixels located at the same coordinate point defined by the sets of image data over plural ones of the frames accepted while shifting the image data at the regular intervals of time in the direction of the time axis; deciding random noise in the image by making a decision as to whether the autocorrelation coefficients found in the autocorrection coefficients finding step are less than a previously set second threshold value and determining that the image data has suffered from deterioration of image quality due to random noise when the autocorrelation coefficients are less than the second threshold value; setting pixel values equal to or larger than the first threshold value as a second pixel value when the decision at the pixel values deciding step is that the pixel values of the pixels are equal to or larger than the first threshold value; finding second autocorrelation coefficients by extracting pixel values which are equal to or larger than the second pixel value and possessed by pixels located at the same coordinate point over plural ones of the frames accepted while shifting the image data at regular intervals of time in the direction of the time axis and finding autocorrelation coefficients of the extracted pixel values; deciding autocorrelation coefficients by making a decision as to whether the autocorrelation coefficients found in the second autocorrelation coefficients finding step are less than a previously set third threshold value; selecting pixel values having autocorrelation coefficients less than the third threshold value as short-distance view pixels when the decision made at the autocorrelation coefficients deciding step is that the autocorrelation coefficients are less than the third threshold value; and making a correction for camera shake regarding short-distance view pixels selected in the short-distance view selecting step.

According to a further embodiment of the present invention, there is provided a noise reduction unit for processing noise in image data, the noise reduction unit including: an image sensor; a signal-processing portion converting an image signal from the image sensor into a digital signal and outputting the converted signal as image data for each frame, the image data indicating sets of pixel values each having a brightness at a corresponding one of coordinate points arranged in directions of rows and columns; pixel value extraction means for accepting the sets of image data delivered from the signal-processing portion in turn for each frame while shifting the image data at regular intervals of time in a direction of a time axis and extracting pixel values, for each frame, represented by the image data accepted for each frame; pixel value decision means for comparing each pixel value extracted by the pixel value extraction means against a previously set first threshold value and making a decision as to whether the pixel value is less than the first threshold value; autocorrelation coefficient calculation means for finding autocorrelation coefficients of pixel values which are less than the first threshold value and which are possessed by pixels located at the same coordinate point defined by the sets of image data over plural ones of the frames accepted while being shifted at the regular intervals of time in the direction of the time axis; and random noise decision means for comparing the autocorrelation coefficients found by the autocorrelation coefficient calculation means against a previously set second threshold value to make a decision as to whether the autocorrelation coefficients are less than the second threshold value and determining that the image data has suffered from deterioration of image quality due to random noise when, the decision the decision that the autocorrelation coefficient is less than the second threshold value.

According to a yet other embodiment of the present invention, there is provided a noise reduction unit for processing noise in image data, the noise reduction unit including: an image sensor; a signal-processing portion for converting an image signal from the image sensor into a digital signal and outputting the converted signal as image data for each frame, the image data indicating sets of pixel values each having a brightness at a corresponding one of coordinate points arranged in directions of rows and columns; pixel value extraction means for accepting the sets of image data delivered from the signal-processing portion in turn for each frame while shifting the sets of image data at regular intervals of time in a direction of a time axis and extracting, for each frame, pixel values represented by the image data accepted for each frame; pixel value decision means for comparing each pixel value extracted by the pixel value extraction means against a previously set first threshold value and making a decision as to whether the pixel value is less than the first threshold value; first autocorrelation coefficient calculation means for finding autocorrelation coefficients of pixel values which are less than the first threshold value and which are possessed by pixels located at the same coordinate point defined by the sets of image data over plural ones of the frames accepted while the sets of image data are being shifted at the regular intervals of time in the direction of the time axis; random noise decision means for making a decision as to whether the autocorrelation coefficients found by the first autocorrelation coefficient calculation means are less than a previously set second threshold value and, when the autocorrelation coefficients are judged to be less than the second threshold value, determines that the image data has suffered from deterioration of image quality due to random noise; pixel value setting means which, when the pixel value decision means has determined that the pixel values of the pixels are equal to or larger than the first threshold value, sets the pixel values equal to or larger than the first threshold value as a second threshold value; second autocorrelation coefficient calculation means for extracting pixel values which are equal to or larger than the second pixel value and which are possessed by pixels located at the same coordinate point over plural ones of the frames accepted while being shifted at the regular intervals of time in the direction of the time axis and finding autocorrelation coefficients of the extracted pixel values; autocorrelation coefficient decision means for making a decision as to whether the autocorrelation coefficients found by the second autocorrelation coefficient calculation means are less than a previously set third threshold value; short-distance view selection means for selecting pixels possessing pixel values having autocorrelation coefficients less than the third threshold value as pixels of a short-distance view of the image when the autocorrelation coefficients are judged to be less than the third threshold value by the autocorrelation coefficient decision means; and camera shake correction means for making a correction for camera shake of the pixels of the short-distance view of the image selected by the short-distance view selection means.

According to an additional embodiment of the present invention, there is provided an imaging apparatus including: an image sensor; an optical system for guiding incident light from a subject into the image sensor; a signal-processing portion for converting an image signal from the image sensor into a digital signal and outputting the converted signal as image data for each frame, the image data indicating sets of pixel values each having a brightness at a corresponding one of coordinate points arranged in directions of rows and columns; and a random noise decision/reduction processing portion for judging and/or reducing random noise generated by the image sensor. The random noise decision/reduction processing portion has: pixel value extraction means for accepting the image data delivered from the signal-processing portion in turn for each frame while shifting the image data at regular intervals of time in a direction of a time axis and extracting, for each frame, the pixel values represented by the image data accepted in each frame; pixel value decision means for comparing each pixel value extracted by the pixel value extraction means against a previously set first threshold value and making a decision as to whether the pixel value is less than the first threshold value; first autocorrelation coefficient calculation means for finding autocorrelation coefficients of the pixel values which are less than the first threshold value and which are possessed by the pixels located at the same coordinate point defined by the image data over plural ones of the frames accepted while being shifted at the regular intervals of time in the direction of the time axis; and random noise decision means for making a decision as to whether the autocorrelation coefficients found by the first autocorrelation coefficient calculation means are less than a previously set second threshold value and, when the autocorrelation coefficients are judged to be less than the second threshold value, determines that the image data has suffered from deterioration of image quality due to random noise.

According to a method of processing noise in image data in accordance with one embodiment of the present invention, the sets of image data delivered from the signal-processing portion are accepted in turn for each frame while shifting the sets of image data at regular intervals of time in the direction of the time axis. Pixel values of the successively accepted sets of image data are extracted for each frame. The extracted pixel values are compared with the previously set first threshold value, and a decision is made as to whether the extracted pixel values represented by the image data are less than the first threshold value. The autocorrelation coefficients of the pixel values are found which are less than the first threshold value and which are possessed by pixels located at the same coordinate point defined by the image data over plural ones of the accepted frames while the sets of image data are being shifted at regular intervals of time in the direction of the time axis. A decision is made as to whether the autocorrelation coefficients are less than the second threshold value. When the autocorrelation coefficients are less than the second threshold value, it is determined that the image data has suffered from deterioration of image quality due to random noise. Therefore, the level of random noise varying in the direction of the time axis can be identified at each pixel. Furthermore, pixels of high levels of noise can be separated from pixels of low levels of noise. Consequently, only pixels having high levels of random noise can be selected and the levels of noise can be reduced easily by an arithmetic averaging method or other processing. Moreover, the amount of computation for autocorrelation coefficients can be reduced greatly. Further, the time taken to calculate the autocorrelation coefficients can be reduced greatly.

According to a method of processing noise in image data in accordance with another embodiment of the present invention, sets of image data delivered from the signal-processing portion are accepted in turn for each frame while being shifted at the regular intervals of time in the direction of the time axis. Pixel values of the image data accepted in turn are extracted for each frame. Each pixel value extracted in the pixel values extracting step is compared with the previously set first threshold value, and a decision is made as to whether the pixel value is less than the first threshold value. The autocorrelation coefficients of pixel values are found which are less than the first threshold value and which are possessed by pixels located at the same coordinate point defined by the sets of image data over plural ones of the frames accepted while being shifted at the regular intervals of time in the direction of the time axis. A decision is made as to whether the autocorrelation coefficients are less than the previously set second threshold value. When the autocorrelation coefficients are less than the second threshold value, it is determined that the image data has suffered from deterioration of image quality due to random noise. Therefore, the level of random noise varying in the direction of the time axis can be identified at each pixel. Furthermore, pixels of high levels of noise can be separated from pixels of low levels of noise. Consequently, only pixels having high levels of random noise can be selected and the levels of noise can be reduced easily by an arithmetic averaging method or other processing. Moreover, the amount of computation for autocorrelation coefficients can be reduced greatly. Further, the time taken to calculate the autocorrelation coefficients can be reduced greatly. When the decision at the pixel value decision step is that the pixel values are equal to or larger than the first threshold value, the pixel values equal to or larger than the first threshold value are set as a second pixel value by a pixel value setting step. Pixel values are extracted which are equal to or larger than the second pixel value and which are possessed by pixels located at the same coordinate point over plural frames accepted while being shifted at the regular intervals of time in the direction of the time axis, and the autocorrelation coefficients of the pixel values are found. A decision is made as to whether the autocorrelation coefficients are less than a previously set third threshold value. When the autocorrelation coefficients are less than the third threshold value, the pixel values having autocorrelation coefficients less than the third threshold value are selected as being possessed by pixels of a short-distance view of the image. A correction is made to correct camera shake in the selected pixels of the short-distance view. Therefore, when camera shake occurs, pixels of long-distance view can be separated from pixels of short-distance view. Consequently, a correction for camera shake can be made only for the pixels of short-distance view which vary to a greater extent than the pixels of long-distance view.

According to a noise reduction unit for processing noise in image data in accordance with one embodiment of the present invention, in each frame, pixel value extraction means extracts pixel values contained in sets of image data which are accepted in turn for successive frames while the sets of image data delivered from a signal-processing portion are being shifted at regular intervals of time in the direction of the time axis. Each pixel value extracted by the pixel value extraction means is compared against a previously set first threshold value. Pixel value decision means makes a decision as to whether the pixel value in the image data is less than the first threshold value. Autocorrelation coefficient calculation means finds the autocorrelation coefficients of the pixel values which are less than the first threshold value and which are possessed by pixels located at the same coordinate point defined by the sets of image data in the plural frames accepted while being shifted at regular intervals of time in the direction of the time axis. Random noise decision means makes a decision as to whether the autocorrelation coefficients are less than a second threshold value. When the decision is that the autocorrelation coefficients are less than the second threshold value, it is determined that the image data has suffered from deterioration of image quality due to random noise. Consequently, the level of random noise varying in the direction of the time axis can be identified at each pixel. Furthermore, pixels having high levels of noise can be separated from pixels having low levels of noise. Hence, only pixels having high levels of random noise can be selected, and the levels of noise can be easily reduced by arithmetic averaging or other similar processing. In addition, the amount of computation of autocorrelation coefficients can be reduced greatly. Moreover, the time taken to calculate the coefficients can be reduced greatly.

According to another noise reduction unit for processing noise in image data in accordance with one embodiment of the present invention, pixel value extraction means extracts pixel values contained in sets of image data which are accepted in turn for each frame while the sets of image data delivered from a signal-processing portion are being shifted at regular intervals of time in the direction of the time axis. Each pixel value extracted by the pixel value extraction means is compared against a previously set first threshold value. Pixel value decision means makes a decision as to whether the pixel value in the image data is less than the first threshold value. First autocorrelation coefficient calculation means finds the autocorrelation coefficients of the pixel values which are less than the first threshold value and which are possessed by pixels located at the same coordinate point defined by the sets of image data over the plural frames accepted while shifting the sets of image data at regular intervals of time in the direction of the time axis. Random noise decision means makes a decision as to whether the autocorrelation coefficients are less than a second threshold value. When the decision is that the autocorrelation coefficients are less than the second threshold value, it is determined that the image data has suffered from deterioration of image quality due to random noise. Consequently, the level of random noise varying in the direction of the time axis can be identified at each pixel. Furthermore, pixels having high levels of noise can be separated from pixels having low levels of noise. Hence, only pixels having high levels of noise can be selected, and the levels of random noise can be easily reduced by arithmetic averaging or other similar processing. In addition, the amount of computation of autocorrelation coefficients can be reduced greatly. Moreover, the time taken to calculate the coefficients can be reduced greatly. When the pixel value decision means has determined that the pixel values are equal to or larger than the first threshold value, pixel value setting means sets the pixel values equal to or larger than the first threshold value as a second pixel value. Pixel values which are equal to or larger than the second threshold value and which are possessed by pixels located at the same coordinate points over the plural frames accepted while being shifted at regular intervals of time in the direction of the time axis are extracted. The autocorrelation coefficients of the extracted pixel values are found by second autocorrelation coefficient calculation means. Autocorrelation coefficient decision means makes a decision as to whether the found autocorrelation coefficients are less than a previously set third threshold value. When the the autocorrelation coefficients are less than the third threshold value, short-distance view selection means selects the pixel values having the autocorrelation coefficients less than the third threshold value as being possessed by pixels of a short-distance view. Camera shake correction means makes a correction for camera shake regarding these selected pixels of the short-distance view. Consequently, when camera shake occurs, pixels of long-distance view can be separated from pixels of short-distance view. Hence, it is possible to make a correction for camera shake only regarding the pixels of long-distance view varying to a greater extent than the pixels of short-distance view.

According to an imaging apparatus according to one embodiment of the present invention, pixel value extraction means extracts pixel values contained in sets of image data which are accepted in turn for each of successive frames while the image data delivered from a signal-processing portion are being shifted at regular intervals of time in the direction of the time axis. Each pixel value extracted by the pixel value extraction means is compared against a previously set first threshold value. Pixel value decision means makes a decision as to whether the pixel value in the image data is less than the first threshold value. First autocorrelation coefficient calculation means finds the autocorrelation coefficients of the pixel values which are less than the first threshold value and which are possessed by pixels located at the same coordinate point defined by the sets of image data over plural ones of the frames accepted while being shifted at regular intervals of time in the direction of the time axis. Random noise decision means makes a decision as to whether the autocorrelation coefficients are less than a second threshold value. When the autocorrelation coefficients are less than the second threshold value, it is determined that the image data has suffered from deterioration of image quality due to random noise. Consequently, the level of random noise varying in the direction of the time axis can be identified at each pixel. Furthermore, pixels having high levels of noise can be separated from pixels having low levels of noise. Hence, only pixels having high levels of random noise can be selected, and the levels of noise can be easily reduced by arithmetic averaging or other similar processing. In addition, the amount of computation of autocorrelation coefficients can be reduced greatly. Moreover, the time taken to calculate the coefficients can be reduced greatly.

While in the foregoing embodiments, the pixel value is decided as to whether it is less than the first threshold value or equal to or larger than the first threshold value, the pixel value may be decided as to whether it is equal to or less than the first threshold value or larger than the first threshold value. Also, although the autocorrelation coefficients are decided as to whether they are less than the second threshold value or equal to or larger than the second threshold value, the autocorrelation coefficients may be decided as to whether they are equal to or less than the second threshold value or larger than the second threshold value. Similarly, although the autocorrelation coefficients found in the second autocorrelation coefficients finding step are decided as to whether they are less than the third threshold value, the autocorrelation coefficients found in the second autocorrelation coefficients finding step may be decided as to whether they are equal to or less than the third threshold value.

DESCRIPTION OF THE PREFERRED EMBODIMENTS

Embodiment 1

A method of processing noise in image data according to an embodiment of the present invention is hereinafter described with reference to the accompanying drawings. Furthermore, a noise reduction unit according to an embodiment of the invention and an imaging apparatus using the noise reduction unit are described.

Figure 1:
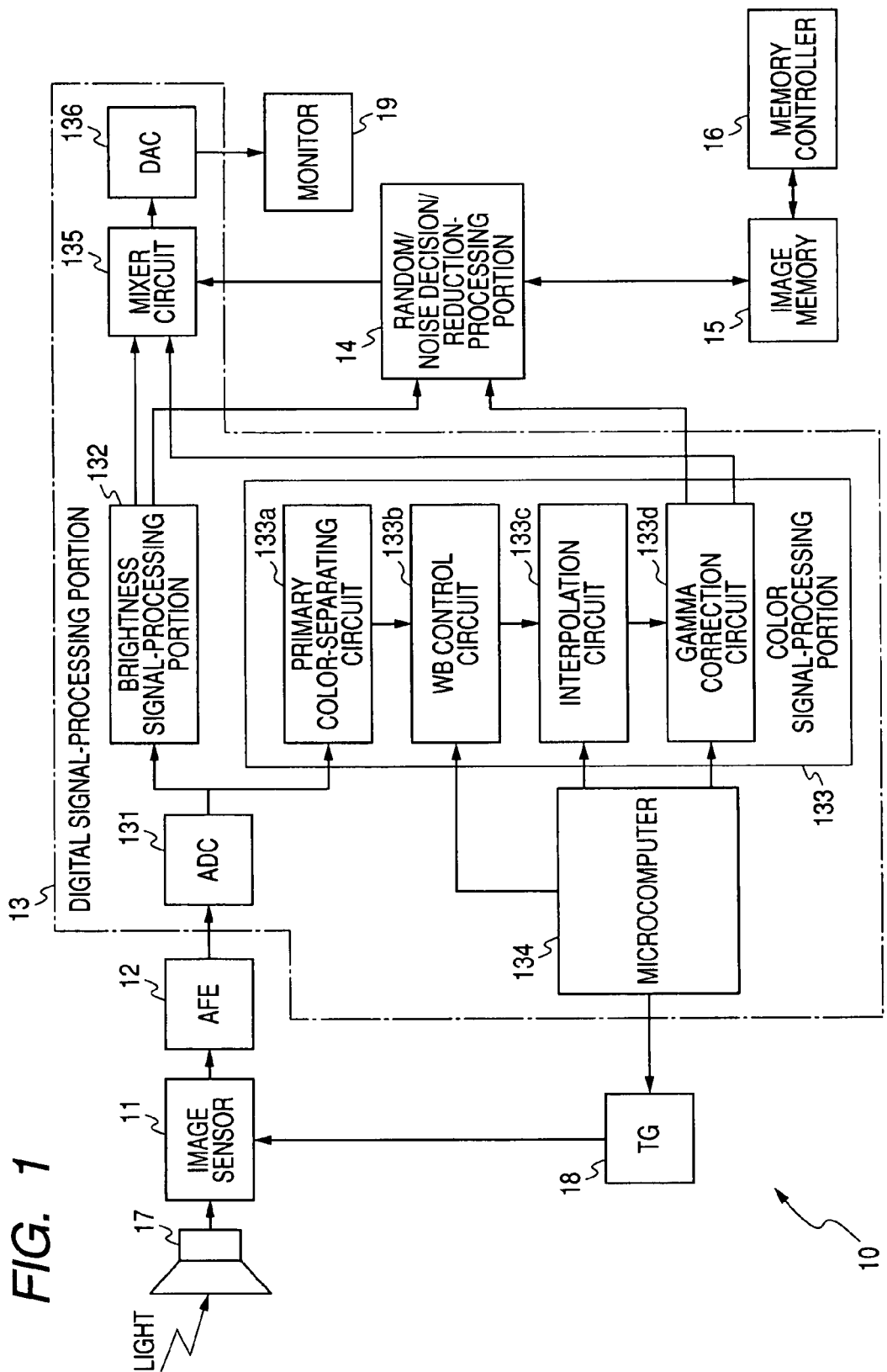
FIG. 1 is a block diagram of the whole structure of an imaging apparatus using a noise reduction unit for processing noise in image data in accordance with Embodiment 1 of the present invention.
Figure 2:
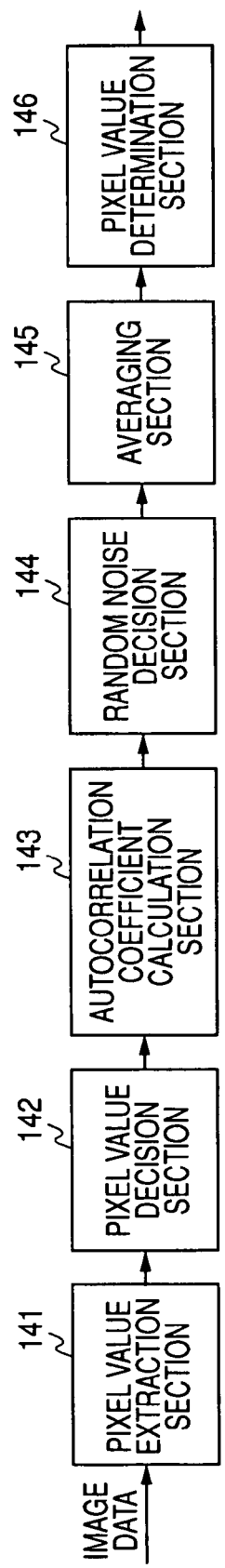
FIG. 2 is a functional block diagram of a random noise decision/reduction processing portion in the apparatus shown in FIG. 1.
Figure 3:
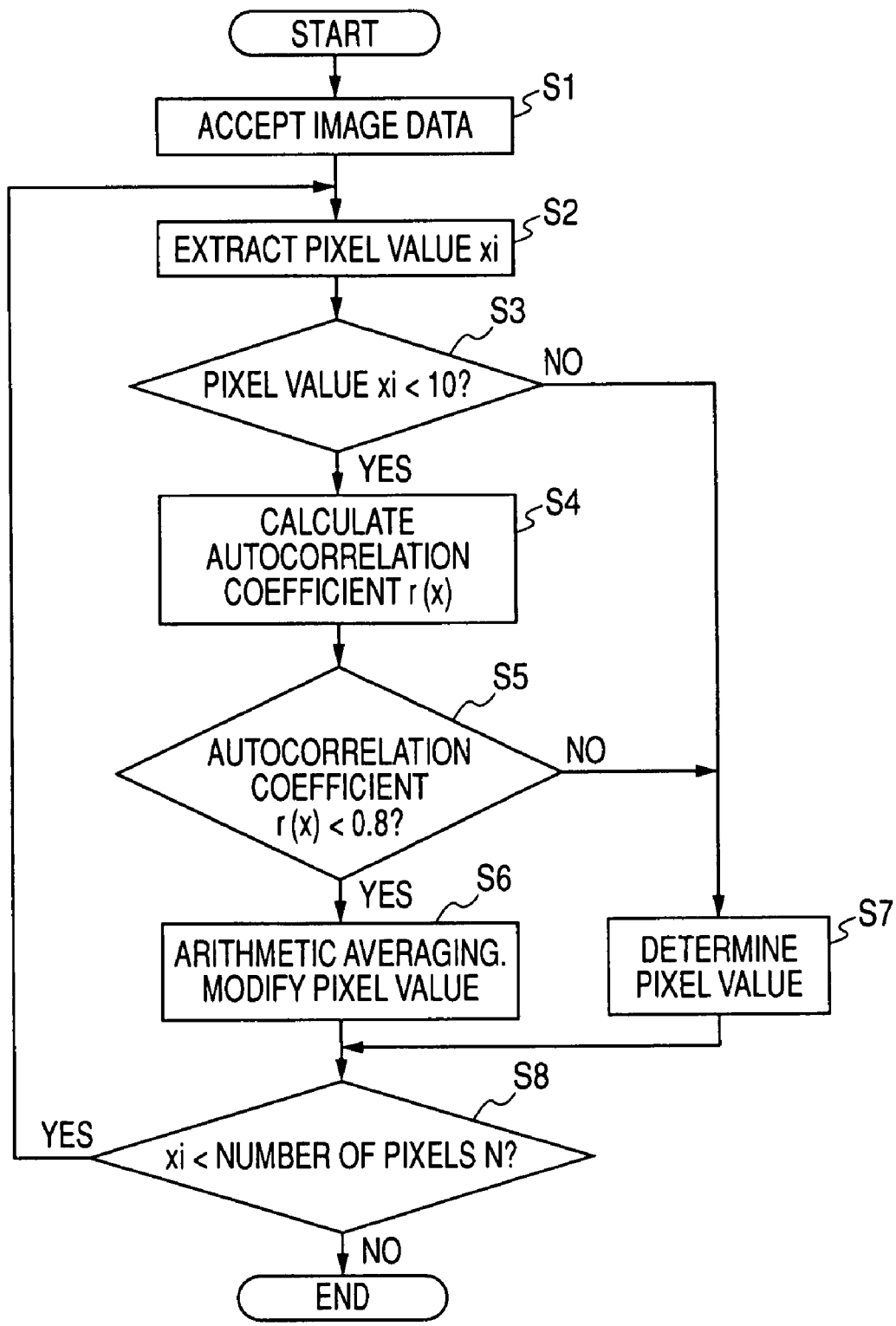
FIG. 3 is a flowchart illustrating a procedure of operations of the random noise decision/reduction processing portion of the apparatus shown in FIG. 1.
Figure 4:
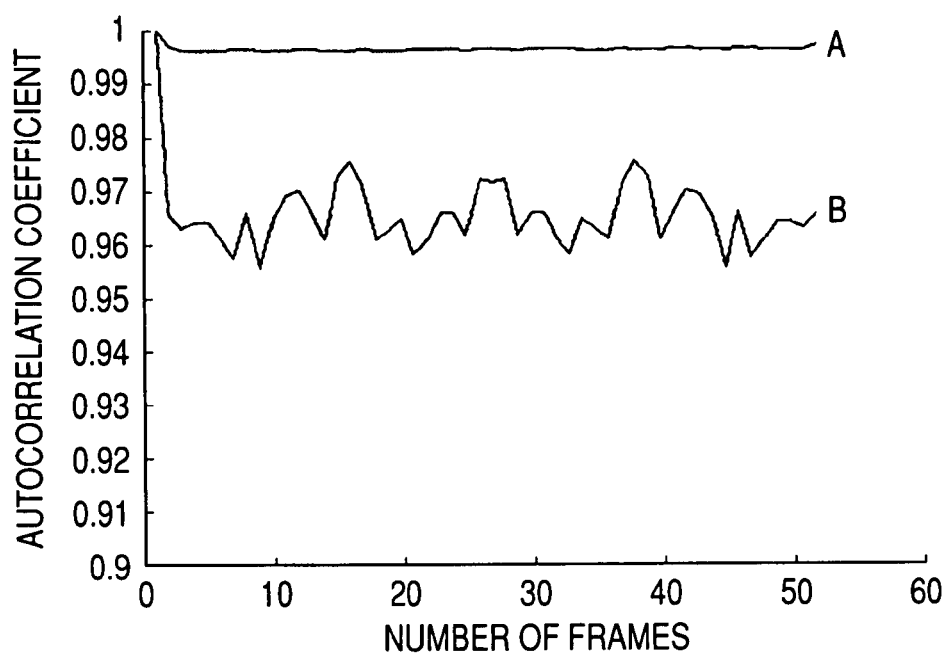
FIG. 4 is a graph illustrating the relationship between the number of frames and autocorrelation coefficient in the apparatus shown in FIG. 1.

FIG. 1 is a block diagram of the whole structure of an imaging apparatus using a noise reduction unit for processing noise in image data in accordance with Embodiment 1 of the present invention. FIG. 2 is a functional block diagram of a random noise decision/reduction processing portion included in the imaging apparatus shown in FIG. 1. FIG. 3 is a flowchart illustrating a procedure of operations performed by the random noise decision/reduction processing portion of the imaging apparatus shown in FIG. 1. FIG. 4 is a graph illustrating the relationship between the number of frames and autocorrelation coefficient used in Embodiment 1 of the invention.

Referring to FIG. 1, an imaging apparatus 10 having a function of processing noise contained in image data includes an image sensor (solid-state imaging device) 11, an AFE (analog front end processor) 12, a digital signal-processing portion 13, a random noise decision/reduction processing portion 14, an image memory 15, and a memory controller 16.

The image sensor 11 is of the CCD or CMOS type, for example, and has a semiconductor substrate on which photodiodes are arranged in a matrix. The sensor 11 detects light from a subject by the photodiodes through an optical lens system 17 and creates a signal charge. The sensor 11 further includes an output circuit (not shown) including a transfer transistor and a reset transistor. The output circuit outputs an image signal of the subject in response to the signal charge. Yellow, cyan, magenta, and green filters are mounted on each of the photodiodes such that the photodiode detects different wavelength ranges of light and thus color photography is enabled.

The image sensor 11 operates based on a clock signal and a vertical/horizontal synchronization signal supplied from a timing generator (TG) 18 and outputs an image signal for each one frame for odd and even fields, for example, by an interlaced scanning method.

The AFE (analog front end processor) 12 includes a correlation double sampling (CDS) circuit and an AGC circuit. The AFE 12 performs correlated double sampling of the image signal from the image sensor 11 to remove fixed pattern noise contained in the image signal and stabilizes the signal level by AGC (automated gain control).

The digital signal-processing portion 13 is a circuit that digitizes the image signal which is output from the image sensor (solid-state imaging device) 11 through the AFE 12 and performs various kinds of processing (such as white balance adjustment, interpolation, and gamma correction) on the digitized image signal. The processing portion 13 creates a brightness signal and a color-difference signal and outputs them. The digital signal-processing portion 13 includes an A/D converter (ADC) 131, a brightness signal (Y signal)-processing portion 132, a color signal (C signal)-processing portion 133, a microcomputer 134, a mixer circuit (YC-MIX) 135, and a D/A converter circuit (DAC) 136.

The A/D converter 131 digitizes the output signal from the AFE 12. The brightness signal-processing portion 132 takes the digitized image signal as an automatic exposure control signal and processes the signal such that the level of the signal is appropriately adjusted.

The color signal-processing portion 133 includes a primary color separation circuit 133a, a WB (white balance) control circuit 133b, an interpolation circuit 133c, and a gamma correction circuit 133d. The primary color separation circuit 133a extracts three primary color signals of red, blue, and green from the output signal from the A/D converter 131. The WB control circuit 133b multiplies these primary color signals by coefficients supplied from the microcomputer 134 to control the signal levels. The interpolation circuit 133c compensates each pixel to which a red color filter is attached, for example, for green and blue color signals under control of the microcomputer 134, in order to form an image file having the same number of pixels as the image sensor 11. The gamma correction circuit 133d gamma-corrects the image signal under control of the microcomputer 134.

The mixer circuit 135 combines the brightness signal delivered by the brightness signal-processing portion 132 and the three primary color signals delivered by the color signal-processing portion 133 into a video signal. The D/A converter 136 converts the video signal into an analog video signal that is output to a monitor 19.

The random noise decision/reduction processing portion 14 is a circuit that judges random noise at each pixel represented by the image data. The circuit also reduces noise (including random noise) at the pixels. The random noise decision/reduction processing portion 14 is connected with the image memory 15. Data processed by the random noise decision/reduction processing portion 14 for noise reduction is output, for example, to the mixer circuit 135. The mixer circuit is controlled based on the data such that random noise within the image data is reduced.

The image memory 15 has a sufficient storage capacity to store plural frames of digitized image data. The memory controller 16 controls the image memory 15 to perform the following various operations. The image data delivered from the digital signal-processing portion 13 is written into the image memory 15. Image data is read from the image memory 15. Image data is read out into the random noise decision/reduction processing portion 14. Data indicating the results of processing performed by the random noise decision/reduction processing portion 14 is written into the image memory 15.

The structure of the random noise decision/reduction processing portion 14 is next described by referring to FIG. 2. The processing portion 14 has a pixel value extraction section 141, a pixel value decision section 142, an autocorrelation coefficient calculation section 143, a random noise decision section 144, an averaging section 145, and a pixel value determination section 146.

The pixel value extraction section 141 accepts each one of successive frames of image data delivered from the digital signal-processing portion 13 while shifting the pixel values of the image data at regular intervals of time τ in the direction of the time axis. The image data indicate a collection of pixels having brightnesses at individual coordinate points arranged in the directions of rows and columns. In each frame, the pixel value extraction section 141 extracts the pixel values indicated by the image data accepted for each frame. The pixel value decision section 142 compares each pixel value extracted by the pixel value extraction section 141 against a previously set first threshold value and makes a decision as to whether the pixel value is less than the first threshold value.

The autocorrelation coefficient calculation section 143 calculates the autocorrelation coefficients of the pixel values which are less than the first threshold value and which are possessed by pixels located at the same coordinate point in each set of image data over plural frames accepted while being shifted at regular intervals of time in the direction of the time axis.

The random noise decision section 144 makes a decision as to whether the autocorrelation coefficient calculated by the autocorrelation coefficient calculation section 143 is less than a previously set second threshold value. When the decision is affirmative (Yes) (i.e., less than the second threshold value), the decision section determines that the image quality has been impaired due to random noise.

When the random noise decision section 144 determines that the image quality has been impaired due to random noise, the averaging section 145 selects only pixels having pixel values less than the first threshold value, arithmetically averages the pixel values, and modifies the pixel values to a pixel value or values exceeding the first threshold value.

When the pixel value decision section 142 determines that the pixel values of the pixels are equal to or larger than the first threshold value, the pixel value determination section 146 determines the pixel values exceeding the first threshold value as the pixel values of the pixels without modification. When the autocorrelation coefficient calculated by the autocorrelation value calculation section 143 is judged to be equal to or larger than a second threshold value, the pixel value determination section 146 has a function of determining that the pixel values corresponding to the autocorrelation coefficient are possessed by dark pixels but have low levels of random noise and determining the pixel values of the pixels as the pixel values of the pixel data items without modification.

The operation of the present Embodiment 1 is next described by referring to FIG. 3.

First, in step S1, sets of image data delivered from the digital signal-processing portion 13 are accepted in turn into the pixel value extraction section 141 for each frame while shifting the sets of image data at regular time intervals of τ in the direction of the time axis. The sets of image data indicate the pixel values of pixels each having a brightness at a corresponding one of coordinate points arranged in the directions of rows and columns.

For example, the image data accepted while shifted at regular intervals of time τ are derived from 50 successive shots taken at regular intervals of time τ by still photography. The image format of the image data is RAW data or BMP file format.

In each frame, the pixel value extraction section 141 extracts the pixel values xi represented by the image data accepted for each frame (step S2).

In the next step S3, the pixel value decision section 142 compares each pixel value extracted by the pixel value extraction section 141 against the previously set first threshold value (e.g., 10) and makes a decision as to whether this pixel value is less than the first threshold value.

In the next step S4, pixel values judged to be less than the first threshold value by the pixel value decision section 142 are accepted into the autocorrelation coefficient calculation section 143 for each frame. The calculation section 143 calculates the autocorrelation coefficient r (τ) of the pixel value of each pixel less than the first threshold value by Eq. (2), the pixel being at the same coordinate point represented by each set of image data over plural ones of the frames accepted while being shifted at regular intervals of time in the direction of the time axis.

$$r(\tau) = \frac{1}{N} \sum_{t=0}^{N-\tau-1} x(t+\tau)x(t) \quad (2)$$

where N is the calculated total number of pixels in the direction of the time axis, x is a pixel value, t is time, and τ is time shifted in the direction of the time axis.

The autocorrelation function r (τ) calculated from Eq. (2) is found by calculating the product of a pixel value x (t) at instant of time t and a pixel value at instant of time (t+τ) shifted from the instant of time t by a regular interval τ and arithmetically averaging the values of the product for the number of pixels N having pixel values less than the first threshold value.

FIG. 4 illustrates the autocorrelation coefficients of a bright pixel A and a dark pixel B. Where pixel values are represented in terms of 0 to 256, the bright pixel A is at a gray level of 180/256. The dark pixel B is at a gray level of 8/256. In FIG. 4, at the pixel A, a sufficient level of light is obtained relative to noise and so the pixel value is almost constant in the direction of the time axis. It has been confirmed that the value of the autocorrelation coefficient is confined within a range and kept close to unity. In contrast, at the pixel B, it can be seen that the autocorrelation coefficient has decreased due to decrease in S/N.

In the next step S5, the random noise decision section 144 makes a decision as to whether the autocorrelation coefficient r (τ) calculated by the autocorrelation coefficient calculation section 143 is less than the previously set second threshold value, for example 0.8. When the decision is affirmative (i.e., less than 0.8), it is determined that the image data has suffered from deterioration of image quality due to random noise.

In the next step S6, when the random noise decision section 144 has determined that the image quality has been impaired due to random noise, the averaging section 145 selects only pixels having pixel values less than the first threshold value (e.g., 10) and arithmetically averaging the selected pixel values to reduce the noise level of the image data. Furthermore, the averaging section 145 modifies the pixel values less than the first threshold value to pixel values exceeding the first threshold value. Consequently, pixels of image data in which random noise is produced are modified to pixel values in which no random noise is produced.

In the aforementioned step S3, when the pixel value decision section 142 has determined that the pixel value xi of any pixel is equal to or larger than the first threshold value (e.g., 10), control goes to step S7, where the pixel value determination section 146 determines the pixel value exceeding the first threshold value as the pixel value of the pixel without modification.

In the step S5, when the random noise decision section 144 has determined that the autocorrelation coefficient $r(\tau)$ calculated by the autocorrelation coefficient calculation section 143 is equal to or larger than a second threshold value (e.g., 0.8), the pixel value determination section 146 accordingly determines that the pixel value corresponding to the autocorrelation coefficient $r(\tau)$ is possessed by a dark pixel but the level of random noise is low, and determines the pixel value possessed by the pixel as the pixel value of the image data without modification.

Then, in each frame, the random noise decision/reduction processing portion 14 makes a decision as to whether a sequence of operations shown in FIG. 3 has been executed for all the pixels having pixel values which are less than the first threshold value (e.g., 10) and which are extracted by the pixel value extraction section 142 (step S8).

When the sequence of operations about the pixels having random noise is not completed, control proceeds to step S2, where the sequence of operations shown in FIG. 3 is repeated the same number of times as there are pixels having random noise. When the decision about noise for all the pixels having random noise and the noise reduction have ended, the processing illustrated in FIG. 3 is also terminated.

Figure 5A:
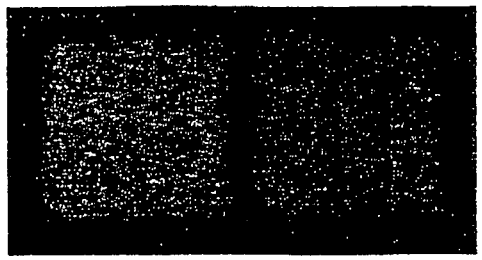
FIG. 5A is a diagram illustrating an image not yet processed by an algorithm according to an embodiment of the present invention.
Figure 5B:
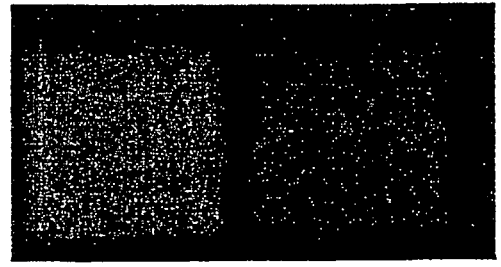
FIG. 5B is a diagram illustrating an image processed by the algorithm according to an embodiment of the present invention.

FIGS. 5A and 5B show the results of processing on an image performed by the algorithm illustrated in FIG. 3. FIG. 5A shows an image not yet processed. FIG. 5B shows an image already processed. The subject was at an illuminance of 3 Lux when measured with a MacBeth color checker chart. As can be seen from FIG. 5A, roughness was present on the surface of the image shown in FIG. 5A. Visual evaluation demonstrates that noise has been reduced. Meanwhile, the surface of the image shown in FIG. 5B was smooth. It has been confirmed that noise has been reduced. According to the algorithm described above, bright pixels are not filtered and so the resolution is not deteriorated. Only dark pixels can be selected. Thus, random noise can be suppressed.

According to Embodiment 1 described so far, pixel values indicated by sets of image data are extracted by the pixel value extraction section 141. The sets of image data are accepted in turn for each frame while shifting the image data delivered from the digital signal-processing portion 13 at regular intervals of time $\tau$ in the direction of the time axis. The pixel value decision section 142 compares each pixel value extracted by the pixel value extraction section 141 against the previously set first threshold value (e.g., 10) and makes a decision as to whether the pixel value is less than the first threshold value. The autocorrelation coefficient calculation section 143 calculates the autocorrelation coefficient $r(\tau)$ of each pixel value which is less than the first threshold value and which is possessed by pixels lying at the same coordinate point defined by the sets of image data over the accepted plural frames while being shifted at regular intervals of time in the direction of the time axis. The random noise decision section 144 makes comparisons to know whether the autocorrelation coefficients are less than the second threshold value (e.g., 0.8). When the autocorrelation coefficient is judged to be less than the second threshold value, it is determined that the image data has suffered from deterioration of image quality due to random noise. The level of random noise varying in the direction of the time axis can be identified at each pixel. Therefore, pixels of low noise levels can be separated from pixels of high noise levels. Only pixels having high levels of random noise can be selected and the levels of noise can be easily reduced by arithmetic averaging or other processing. In addition, the amount of computation of the autocorrelation coefficients can be reduced greatly. Moreover, the time taken to calculate the autocorrelation coefficients can be reduced greatly.

Embodiment 2

Figure 6:
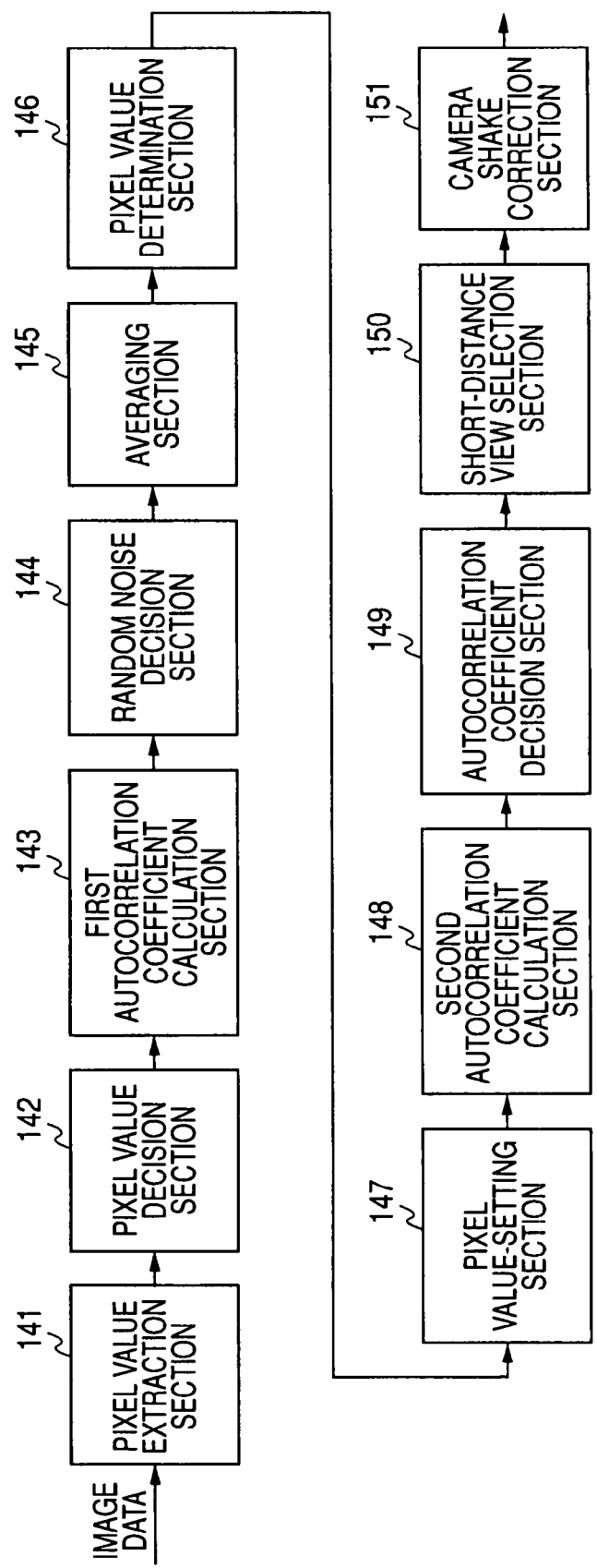
FIG. 6 is a functional block diagram of a random noise decision/reduction processing portion in an apparatus according to Embodiment 2 of the present invention.
Figure 7:
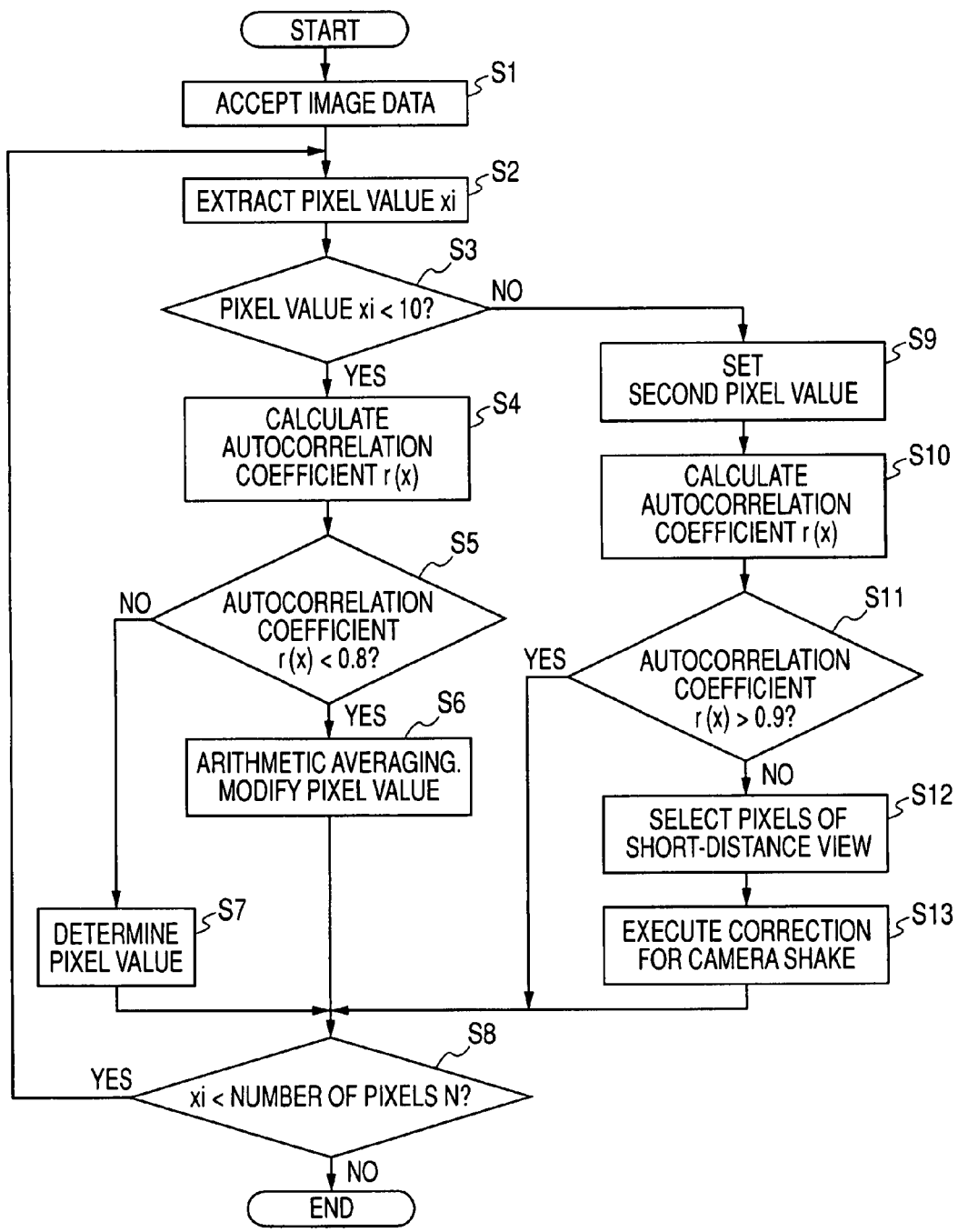
FIG. 7 is a flowchart illustrating a procedure of operations of the random noise decision/reduction processing portion of the apparatus according to Embodiment 1.
Figure 8:
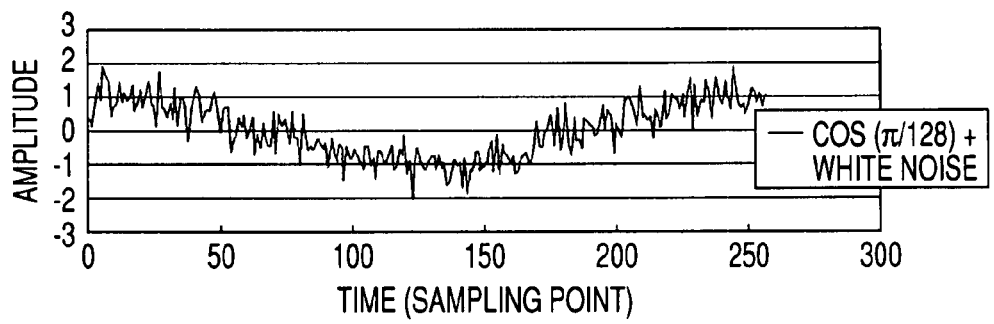
FIG. 8 is a waveform diagram illustrating a profile obtained when white noise is superimposed on an original signal having periodicity, as used in the related art.
Figure 9:
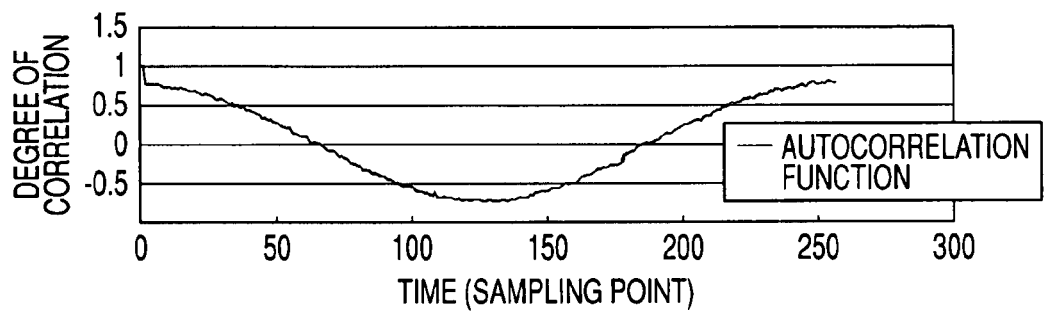
FIG. 9 is a waveform diagram illustrating the degree of autocorrelation obtained when white noise is removed by a related-art autocorrelation method.
Figure 10:
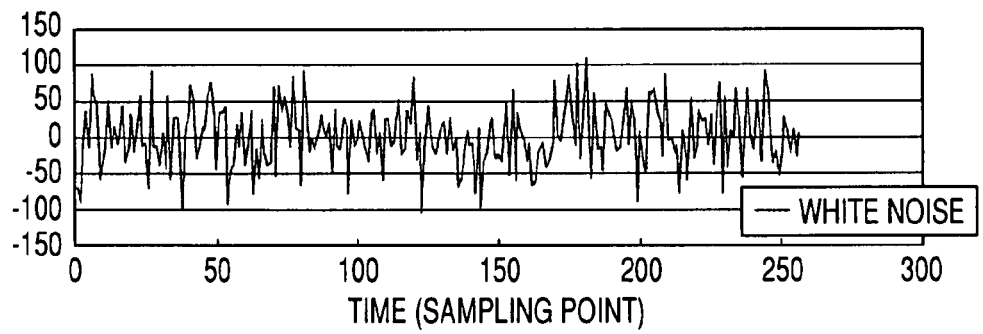
FIG. 10 is a waveform diagram illustrating a profile of white noise having no periodicity, as used in the related art.
Figure 11:
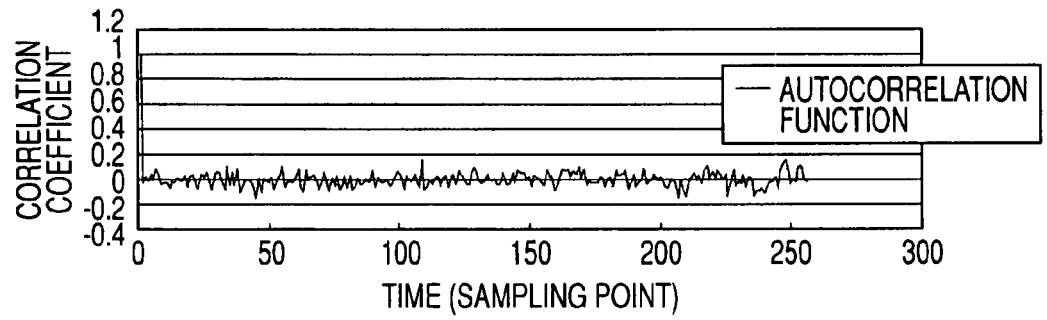
FIG. 11 is a waveform diagram showing the output result of an autocorrelation function of white noise having no periodicity, as used in the related art.

Embodiment 2 of a random noise decision/reduction processing portion according to the present invention is next described by referring to FIGS. 6 and 7.

FIG. 6 is a functional block diagram of the random noise decision/reduction processing portion of Embodiment 2 of the present invention. FIG. 7 is a flowchart illustrating a procedure of operations performed by the random noise decision/reduction processing portion of Embodiment 1 of the invention.

The random noise decision/reduction processing portion 14 according to the present Embodiment 2 has pixel value extraction section 141, pixel value decision section 142, first autocorrelation coefficient calculation section 143, random noise decision section 144, averaging section 145, and pixel value determination section 146 in the same way as the above-described Embodiment 1. Furthermore, the random noise decision/reduction processing portion 14 according to Embodiment 2 has pixel value setting section 147, second autocorrelation coefficient calculation section 148, autocorrelation coefficient decision section 149, short-distance view selection section 150, and camera shake correction section 151. Accordingly, only the structures of these newly added components are described with reference to FIG. 6. Detailed description of those components which have been already described in connection with FIG. 2 will be omitted below.

Referring to FIG. 6, When the pixel value of each pixel is judged to be equal to or larger than the first threshold value (e.g., 10) by the pixel value decision section 142, the pixel value setting section 147 sets this pixel value exceeding the first threshold value as a second pixel value (e.g., 15).

The second autocorrelation coefficient calculation section 148 extracts pixel values which are equal to or less than the second pixel value (e.g., 15) and which are possessed by pixels located at the same coordinate point over plural frames accepted while being shifted at regular intervals of time $\tau$ in the direction of the time axis, and finds the autocorrelation coefficient $r(\tau)$ of the pixel value.

The autocorrelation coefficient decision section 149 makes a decision as to whether the autocorrelation coefficient $r(\tau)$ found by the second autocorrelation coefficient calculation section 148 is less than a previously set third threshold value (e.g., 0.9).

When the autocorrelation coefficient decision section 149 has determined that the autocorrelation coefficient is less than the third threshold value, the short-distance view selection section 150 selects pixel values having autocorrelation coefficients less than the third threshold value as being possessed by short-distance pixels of the image.

The camera shake correction section 151 makes corrections for camera shake of the short-distance view pixels selected by the short-distance view selection section 150.

The operation of the present Embodiment 2 is next described by referring to FIG. 7.

First, in step S1, sets of image data delivered from the digital signal processing portion 13 are accepted in turn into the pixel value extraction section 141 for each frame while shifting the sets of image data at regular intervals of τ in the direction of the time axis. The sets of image data indicate the pixel values of pixels each having a brightness at a corresponding one of coordinate points arranged in the directions of rows and columns. In each frame, the pixel value extraction section 141 extracts the pixel values xi represented by the image data accepted in each frame (step S2).

In the next step S3, the pixel value decision section 142 compares each pixel value extracted by the pixel value extraction section 141 against the previously set first threshold value (e.g., 10) and makes a decision as to whether this pixel value is less than the first threshold value.

In the next step S4, pixel values judged to be less than the first threshold value by the pixel value decision section 142 are accepted into the first autocorrelation coefficient calculation section 143. The calculation section 143 calculates the autocorrelation coefficient r (τ) of the pixel value of each pixel less than the first threshold value using Eq. (2) above, the pixel being at the same coordinate point represented by each set of image data over plural frames accepted while being shifted at regular intervals of time in the direction of the time axis.

In the next step S5, the random noise decision section 144 makes a decision as to whether the autocorrelation coefficient r (τ) calculated by the first autocorrelation coefficient calculation section 143 is less than the previously set second threshold value, (e.g., 0.8). When the decision is affirmative (e.g., less than 0.8), it is determined that the image data has suffered from deterioration of image quality due to random noise.

In the next step S6, when the random noise decision section 144 has determined that the image quality has been impaired due to random noise, the averaging section 145 selects only pixels having pixel values less than the first threshold value (e.g., 10) and arithmetically averages the selected pixel values to reduce the noise level of the image data. Furthermore, the averaging section 145 modifies the pixel values less than the first threshold value to pixel values exceeding the first threshold value. Consequently, pixels of image data in which random noise is created are modified to pixel values in which there is no random noise.

In the above-described step S5, when the random noise decision section 144 has determined that the autocorrelation coefficients r (τ) calculated by the first autocorrelation coefficient calculation section 143 are equal to or less than a second threshold value (e.g., 0.8), the pixel value determination section 146 determines that the pixel values corresponding to the autocorrelation coefficient r (τ) are possessed by dark pixels but the levels of random noise are low, and determines the pixel values possessed by the pixels as the pixel values of the image data without modification.

Then, in each frame, the random noise decision/reduction processing portion 14 makes a decision as to whether a sequence of operations shown in FIG. 3 has been executed for all the pixels having pixel values which are less than the first threshold value (e.g., 10) and which are extracted by the pixel value extraction section 142 (step S8).

When the sequence of operations about the pixels having random noise is not completed, control proceeds to step S2, where the sequence of operations shown in FIG. 3 is repeated the same number of times as there are pixels having random noise. When the decision about noise for all the pixels having random noise and the noise reduction have ended, the processing (subroutine) illustrated in FIG. 3 is also terminated.

When the pixel value decision section 142 has determined that the pixel value xi of the pixel is equal to or less than the first threshold value (e.g., 10) in the step S3, control goes to step S9, where the pixel value setting section 147 sets pixel values judged to be equal to or less the first threshold value as a new second pixel value (e.g., 15).

In the next step S10, the second autocorrelation coefficient calculation section 148 extracts pixel values which are equal to or larger than the second pixel value (e.g., 15) and which are possessed by pixels located at the same coordinate point over plural frames accepted while being shifted at regular intervals of time τ in the direction of the time axis, and calculates the autocorrelation coefficients r (τ) of the pixel values.

In the next step S11, the autocorrelation coefficient decision section 149 makes a decision as to whether the autocorrelation coefficients r (τ) found by the second autocorrelation coefficient calculation section 148 are less than a previously set third threshold value (e.g., 0.9).

In the next step S12, when the autocorrelation coefficient decision section 149 has determined that the autocorrelation coefficient is less than the third threshold value, the short-distance selection section 150 selects the pixel values having autocorrelation coefficients less than the third threshold value as being possessed by pixels of a short-distance view.

Then, the camera shake correction section 151 executes correction of camera shake for the short-distance view pixels selected by the short-distance view selection section 150 (step S13). After the execution of this correction, control goes to step S9, and processing of this step and the following steps is carried out.

According to the Embodiment 2 described so far, the same advantages as derived by the above Embodiment 1 are obtained. In addition, when camera shake occurs, pixels of long-distance views can be separated from pixels of short-distance views. Consequently, camera shake correction can be made only for pixels of short-distance views which vary to a greater extent than pixels of long-distance views. By applying this correction technique to a digital camera or video camera, camera shake correction can be made utilizing extraction of pixels which are affected greatly by camera shake. Furthermore, detection of an animal body can be performed.

With respect to one image, the distance between the subject and the imaging device may normally assume various values. That is, there exists the relationship that the subject is at a short distance while the background is at a large distance. Usually, in a photography set such as a digital camera, an algorithm for correction of camera shake is introduced. Since the whole image is corrected uniformly (i.e., pixels are shifted in the direction reverse to the direction in which motion causing camera shake occurs), a long-distance view and a short-distance view are corrected by the same algorithm. It is to be noted, however, camera shake is corrected electronically herein.

In this case, when pixels of a long-distance view and pixels of a short-distance view can be separated during camera shake correction, only the pixels of the short-distance view can be corrected for camera shake. That is, when camera shake occurs, the pixels of the long-distance view vary to a lesser extent but the pixels of the short-distance view vary to a greater extent. This fact is reflected in computation of autocorrelation coefficients according to an embodiment of the present invention. That is, where there are autocorrelation coefficients exceeding a certain threshold value, an electronic correction can be carried out for camera shake only regarding pixels producing such autocorrelation coefficients.

In one embodiment of the present invention, where successive frames of images are shot at regular intervals, it is assumed that some pixels have autocorrelation coefficients of 0.93, 0.95, 0.85, 0.99, 0.93, 0.89, 0.91, . . . , respectively. A threshold value of 0.90 is established. Numerical values less than 0.90 are excluded from the computation. High-quality images in which random noise has been suppressed can be obtained by performing calculations using the other numerical values.

It should be understood by those skilled in the art that various modifications, combinations, sub-combinations and alterations may occur depending on design requirements and other factors insofar as they are within the scope of the appended claims or the equivalents thereof.

What is claimed is:

1. A method of processing noise in image data by an image processor having a signal-processing portion converting an image signal from an image sensor into a digital signal and outputting the converted signal as image data for each frame, the image data indicating sets of pixel values each having a brightness at a corresponding one of coordinate points arranged in directions of rows and columns, the method comprising the steps of:

extracting pixel values by accepting each frame of the image data delivered from the signal-processing portion in turn while shifting the image data at regular intervals of time in a direction of a time axis and extracting, in each frame, pixel values represented by the image data accepted for each frame;

deciding pixel value by comparing each pixel value extracted by the pixel values extracting step against a previously set first threshold value and making a decision as to whether the pixel value is less than the first threshold value;

finding autocorrelation coefficients of pixel values which are less than the first threshold value and which are possessed by pixels located at the same coordinate point defined by the sets of image data over plural ones of the frames accepted while being shifted at the regular intervals of time; and deciding random noise in the image by making a decision as to whether the autocorrelation coefficients found in the autocorrelation coefficients finding step are less than a previously set second threshold value and determining that the image data has suffered from deterioration of image quality due to random noise when the autocorrelation coefficients are less than the second threshold value.

2. The method of processing noise in image data as set forth in claim 1, further comprising the step of averaging pixel values by selecting only pixels having pixel values less than the first threshold value, when the decision made at the random noise deciding step is that image quality has been deteriorated due to random noise, arithmetically averaging the selected pixel values, and modifying the pixel values to a pixel value equal to or larger than the first threshold value.

3. The method of processing noise in image data as set forth in claim 1, further comprising the step of determining the pixel values equal to or larger than the first threshold value as the pixel values of the pixels without modification when the decision made at the random noise deciding step is that the pixels of the pixels are equal to or larger the first threshold value.

4. The method of processing noise in image data as set forth in claim 3, wherein in the pixel values determining step, when the decision at the random noise deciding step is that the autocorrelation coefficients found in the autocorrelation coefficients finding step are equal to or larger than the second threshold value, pixel values corresponding to the autocorrelation coefficients are judged to be possessed by dark pixels but have low levels of random noise and are determined as the pixel values represented by the pixel data without modification.

5. The method of processing noise in image data as set forth in claim 1, wherein the pixel values extracting step, the pixel values deciding step, the autocorrelation coefficients finding step, and the random noise deciding step are repeated the same number of times as there are pixels having pixel values less than the first threshold value.

6. The method of processing noise in image data as set forth in claim 1, wherein in the pixel values deciding step, pixel values represented by the image data which are accepted for each frame and which are less than the first threshold value are plural pixel values in an identical coordinate area on an image in the frames.

7. A method of processing noise in image data by an image processor having a signal-processing portion for converting an image signal from an image sensor into a digital signal and outputting the converted signal as image data for each frame, the image data indicating sets of pixel values each having a brightness at a corresponding one of coordinate points arranged in directions of rows and columns, the method comprising the steps of:

extracting pixel values by accepting the sets of image data delivered from the signal-processing portion in turn for each frame while shifting the sets of image data at regular intervals of time in a direction of a time axis and extracting, in each frame, the pixel values represented by the image data accepted in each frame;

deciding pixel values by comparing each pixel value extracted by the pixel values extracting step against a previously set first threshold value and making a decision as to whether the pixel value is less than the first threshold value;

finding first autocorrelation coefficients of pixel values which are possessed by pixels located at the same coordinate point defined by the image data over plural ones of the frames accepted while being shifted at the regular intervals of time in the direction of the time axis;

deciding random noise in the image by making a decision as to whether the autocorrelation coefficients found in the autocorrelation coefficients finding step are less than a previously set second threshold value and determining that the image data has suffered from deterioration of image quality due to random noise when the autocorrelation coefficients are less than the second threshold value;

setting pixel values equal to or larger than the first threshold value as a second pixel value when the decision at the pixel values deciding step is that the pixel values of the pixels are equal to or larger than the first threshold value;

finding second autocorrelation coefficients by extracting pixel values which are equal to or larger than of the second pixel value and which are possessed by pixels located at the same coordinate point over plural frames accepted while being shifted at the regular intervals of time in the direction of the time axis and finding the autocorrelation coefficients of the extracted pixel values;

deciding autocorrelation coefficients by making a decision as to whether the autocorrelation coefficients found in the second autocorrelation coefficients finding step are less than a previously set third threshold value;

selecting pixels possessing pixel values having autocorrelation coefficients less than the third threshold value as pixels of a short-distance view of the image when the decision made at the autocorrelation coefficients deciding step is that the autocorrelation coefficients are less than the third threshold value; and making a correction for camera shake regarding the pixels of the short-distance view selected in the short-distance view selecting step.

8. The method of processing noise in image data as set forth in claim 7, further comprising the step of averaging pixel values by selecting only pixels having pixel values less than the first threshold value, when the decision made at the random noise deciding step is that image quality has been deteriorated due to random noise, arithmetically averaging the selected pixel values, and modifying the pixel values to a pixel value equal to or larger than the first threshold value.

9. The method of processing noise in image data as set forth in claim 7, further comprising the step of determining the pixel values equal to or larger than the first threshold value as the pixel values of the pixels without modification when the decision made at the random noise deciding step is that the pixel values of the pixels are equal to or larger than the first threshold value.

10. The method of processing noise in image data as set forth in claim 9, wherein when the decision made in the random noise deciding step is that the autocorrelation coefficients found in the autocorrelation coefficients deciding step are equal to or larger than the second threshold value, pixel values corresponding to the autocorrelation coefficients are judged to be possessed by dark pixels but have low levels of random noise and are determined as the pixel values represented by the pixel data without modification.

11. The method of processing noise in image data as set forth in claim 7, wherein the pixel values extracting step, the pixel values deciding step, the first autocorrelation coefficients finding step, and the random noise deciding step are repeated the same number of times as there are pixels which are extracted by the pixel values extracting step and which have pixel values less than the first threshold value.

12. The method of processing noise in image data as set forth in claim 7, wherein in the pixel values deciding step, pixel values represented by the image data which are accepted for each frame and which are less than the first threshold value are plural pixel values in an identical coordinate area on an image in the frames.

13. A noise reduction unit for processing noise in image data, comprising:

an image sensor;

a signal-processing portion for converting an image signal from the image sensor into a digital signal and outputting the converted signal as sets of image data for each frame, each set of image data indicating a pixel value having a brightness at a corresponding one of coordinate points arranged in directions of rows and columns;

pixel value extraction means for accepting the sets of image data from the signal-processing portion in turn for each frame while shifting the sets of image data at regular intervals of time in a direction of a time axis and extracting, in each frame, the pixel values represented by the image data accepted in each frame;

pixel value decision means for comparing each pixel value extracted by the pixel value extraction means against a previously set first threshold value and making a decision as to whether the pixel value is less than the first threshold value;

autocorrelation coefficient calculation means for finding autocorrelation coefficients of the pixel values which are less than the first threshold value and which are possessed by the pixels located at the same coordinate point defined by the image data over plural ones of the frames accepted while being shifted at the regular intervals of time in the direction of the time axis; and random noise decision means for making a decision as to whether each autocorrelation coefficient found by the autocorrelation coefficient calculation means is less than a previously set second threshold value and determining that the image data has suffered from deterioration of image quality due to random noise when the decision is that the autocorrelation coefficient is less than the second threshold value.

14. The noise reduction unit for processing noise in image data as set forth in claim 13, further comprising averaging means for selecting only pixels having pixel values less than the first threshold value when the random noise decision means has determined that image quality has been deteriorated due to random noise, arithmetically averaging the selected pixel values, and modifying the pixel values to a pixel value equal to or larger than the first threshold value.

15. The noise reduction unit for processing noise in image data as set forth in claim 13, further comprising pixel value determination means for determining pixel values equal to or larger than the first threshold value as the pixel values of the pixels without modification when the pixel value decision means has determined that the pixel values of the pixels are equal to or larger than the first threshold value.

16. The noise reduction unit for processing noise in image data as set forth in claim 13, wherein when the random noise decision means has determined that the autocorrelation coefficients found by the autocorrelation coefficient calculation means are equal to or larger than the second threshold value, the pixel value determination means judges pixel values corresponding to the autocorrelation coefficients to be possessed by dark pixels but have low levels of random noise and determines the pixel values possessed by the pixels as the pixel values indicated by the pixel data without modification.

17. The noise reduction unit for processing noise in image data as set forth in claim 13, wherein operations respectively performed by the pixel value extraction means, the pixel value decision means, the autocorrelation coefficient calculation means, and the random noise decision means are repeated the same number of times as there are pixels which are extracted by the pixel value extraction means and which have pixel values less than the first threshold value.

18. The noise reduction unit for processing image in image data as set forth in claim 13, wherein in the pixel value decision means, pixel values represented by the image data which are accepted for each frame and which are less than the first threshold value are plural pixel values in an identical coordinate area on an image in the frames.

19. A noise reduction unit for processing noise in image data, comprising:

an image sensor;

a signal-processing portion for converting an image signal from the image sensor into a digital signal and outputting the converted signal as sets of image data for each frame, each set of image data indicating a pixel value having a brightness at a corresponding one of coordinate points arranged in directions of rows and columns;

pixel value extraction means for accepting the sets of image data delivered from the signal-processing portion in turn for each frame while shifting the image data at regular intervals of time in a direction of a time axis and extracting, in each frame, the pixel values represented by the image data accepted in each frame;

pixel value decision means for comparing each pixel value extracted by the pixel value extraction means against a previously set first threshold value and making a decision as to whether the pixel value is less than the first threshold value;

first autocorrelation coefficient calculation means for finding autocorrelation coefficients of pixel values which are less than the first threshold value and which are possessed by pixels located at the same coordinate point defined by the image data over plural ones of the frames accepted while being shifted at the regular intervals of time in the direction of the time axis;

random noise decision means for making a decision as to whether the autocorrelation coefficients found by the first autocorrelation coefficient calculation means are less than a previously set second threshold value and, when the autocorrelation coefficients are judged to be less than the second threshold value, determining that the image data has suffered from deterioration of image quality due to random noise;

pixel value setting means which, when the pixel value decision means has determined that the pixel values of the pixels are equal to or larger than the first threshold value, sets the pixel values equal to or larger than the first threshold value as a second threshold value;

second autocorrelation coefficient calculation means for extracting pixel values which are equal to or larger than the second threshold value and which are possessed by pixels located at the same coordinate point over plural ones of the frames accepted while being shifted at the regular intervals of time in the direction of the time axis and finding autocorrelation coefficients of the extracted pixel values;

autocorrelation coefficient decision means for making a decision as to whether the autocorrelation coefficients found by the second autocorrelation coefficient calculation means are less than a previously set third threshold value;

short-distance view selection means for selecting pixels possessing pixel values having autocorrelation coefficients less than the third threshold value as pixels of a short-distance view of the image when the autocorrelation coefficients are judged to be less than the third threshold value by the autocorrelation coefficient decision means; and camera shake correction means for making a correction for camera shake of the pixels of the short-distance view of the image selected by the short-distance view selection means.

20. The noise reduction unit for processing noise in image data as set forth in claim 19, further comprising averaging means for selecting only pixels having pixel values less than the first threshold value when the random noise decision means has determined that image quality has been deteriorated due to random noise, arithmetically averaging the selected pixel values, and modifying the pixel values to a pixel value equal to or larger than the first threshold value.

21. The noise reduction unit for processing image in image data as set forth in claim 19, further comprising pixel value determination means for determining pixel values equal to or larger than the first threshold value as the pixel values of the pixels without modification when the pixel value decision means has determined that the pixel values of the pixels are equal to or larger than the first threshold value.

22. The noise reduction unit for processing noise in image data as set forth in claim 19, wherein when the random noise decision means has determined that the autocorrelation coefficients found by the first autocorrelation coefficient calculation means are equal to or larger than the second threshold value, the pixel value determination means judges pixel values corresponding to the autocorrelation coefficients to be possessed by dark pixels but have low levels of random noise and determines the pixel values possessed by the pixels as the pixel values represented by the pixel data without modification.

23. The noise reduction unit for processing noise in image data as set forth in claim 19, wherein operations respectively performed by the pixel value extraction means, the pixel value decision means, the autocorrelation coefficient calculation means, and random noise decision means are repeated the same number of times as there are pixels which are extracted by the pixel value extraction means and which have pixel values less than the first threshold value.

24. The noise reduction unit for processing noise in image data as set forth in claim 19, wherein pixel values which are accepted for each of the pixels and which are judged to be less than the first threshold value by the pixel value decision means are plural pixel values in an identical coordinate area on an image in the frames.

25. An imaging apparatus comprising:
an image sensor;
an optical system for guiding incident light from a subject into the image sensor;
a signal-processing portion for converting an image signal from the image sensor into a digital signal and outputting the converted signal as image data for each frame, the image data including pixel values each having a brightness at a corresponding one of coordinate points arranged in directions of rows and columns; and
a random noise decision/reduction processing portion which judges and/or reduces random noise generated by the image sensor;
wherein the random noise decision/reduction processing portion has:
pixel value extraction means for accepting the image data delivered from the signal-processing portion in turn for each frame while shifting the image data at regular intervals of time in a direction of a time axis and extracting, in each frame, the pixel value represented by the image data accepted in each frame;
pixel value decision means for comparing each pixel value extracted by the pixel value extraction means against a previously set first threshold value and making a decision as to whether the pixel value is less than the first threshold value;
first autocorrelation coefficient calculation means for finding autocorrelation coefficients of the pixel values which are less than the first threshold value and which are possessed by the pixels located at the same coordinate point defined by the image data over plural ones of the frames accepted while being shifted at the regular intervals of time in the direction of the time axis; and
random noise decision means for making a decision as to whether the autocorrelation coefficients found by the first autocorrelation coefficient calculation means are less than a previously set second threshold value and, when the autocorrelation coefficients are judged to be less than the second threshold value, determining that the image data has suffered from deterioration of image quality due to random noise.

26. The imaging apparatus as set forth in claim 25, wherein the random noise decision/reduction processing portion further includes:
pixel value setting means for setting the pixel values equal to or larger than the first threshold value as a second pixel value when the pixel value decision means has determined that the pixel values of the pixels are equal to or larger than the first threshold value;
second autocorrelation coefficient calculation means for extracting pixel values which are equal to or larger than the second pixel value and which are possessed by pixels located at the same coordinate point over plural ones of the plural frames accepted while being shifted at the regular intervals of time in the direction of the time axis and finding autocorrelation coefficients of the extracted pixel values;
autocorrelation coefficient decision means for making a decision as to whether the autocorrelation coefficients found by the second autocorrelation coefficient calculation means are less than a previously set third threshold value;
short-distance view selection means for selecting pixels possessing pixel values having autocorrelation coefficients less than the third threshold value as pixels of a short-distance view of the image when the autocorrelation coefficients are judged to be less than the third threshold value by the autocorrelation coefficient decision means; and
camera shake correction means for making a correction for camera shake of the pixels of the short-distance view of the image selected by the short-distance view selection means.

27. The imaging apparatus as set forth in claim 25, wherein the random noise decision/reduction processing portion further includes averaging means for selecting only pixels having pixel values less than the first threshold value when the random noise decision means has determined that image quality has been deteriorated due to random noise, arithmetically averaging the selected pixel values, and modifying the pixel values to a pixel value equal to or larger than the first threshold value.

28. The imaging apparatus as set forth in claim 25, further comprising pixel value determination means for determining pixel values equal to or larger than the first threshold value as the pixel values of the pixels without modification when the pixel value decision means has determined that the pixel values of the pixels are equal to or larger than the first threshold value.

29. The imaging apparatus as set forth in claim 25, wherein when the random noise decision means has determined that the autocorrelation coefficients found by the first autocorrelation coefficient calculation means are equal to or larger than the second threshold value, the pixel value determination means judges pixel values corresponding to the autocorrelation coefficients to be possessed by dark pixels but have low levels of random noise and determines the pixel values possessed by the pixels as the pixel values represented by the pixel data without modification.

30. The imaging apparatus as set forth in claim 25, wherein operations respectively performed by the pixel value extraction means, the pixel value decision means, the autocorrelation coefficient calculation means, and the random noise decision means are repeated the same number of times as there are pixels which are extracted by the pixel value extraction means and which are possessed by pixel values less than the first threshold value.

31. The imaging apparatus as set forth in claim 25, wherein pixel values which are accepted for each of the pixels and which are judged to be less than the first threshold value by the pixel value decision means are plural pixel values in an identical coordinate area on an image in the frames.

32. A noise reduction unit for processing noise in image data, comprising:
an image sensor;
a signal-processing portion for converting an image signal from the image sensor into a digital signal and outputting the converted signal as sets of image data for each frame, each set of image data indicating a pixel value having a brightness at a corresponding one of coordinate points arranged in directions of rows and columns;
a pixel value extraction section which accepts the sets of image data from the signal-processing portion in turn for each frame while shifting the sets of image data at regular intervals of time in a direction of a time axis and extracts, in each frame, the pixel values represented by the image data accepted in each frame;
a pixel value decision section which compares each pixel value extracted by the pixel value extraction section against a previously set first threshold value and makes a decision as to whether the pixel value is less than the first threshold value;
an autocorrelation coefficient calculation section which finds autocorrelation coefficients of the pixel values which are less than the first threshold value and which are possessed by the pixels located at the same coordinate point defined by the image data over plural ones of the frames accepted while being shifted at the regular intervals of time in the direction of the time axis; and
a random noise decision section which makes a decision as to whether each autocorrelation coefficient found by the autocorrelation coefficient calculation section is less than a previously set second threshold value and determines that the image data has suffered from deterioration of image quality due to random noise when the decision is that the autocorrelation coefficient is less than the second threshold value.

33. A noise reduction unit for processing noise in image data, comprising:
an image sensor;
a signal-processing portion for converting an image signal from the image sensor into a digital signal and outputting the converted signal as sets of image data for each frame, each set of image data indicating a pixel value having a brightness at a corresponding one of coordinate points arranged in directions of rows and columns;
a pixel value extraction section which accepts the sets of image data delivered from the signal-processing portion in turn for each frame while shifting the image data at regular intervals of time in a direction of a time axis and extracts, in each frame, the pixel values represented by the image data accepted in each frame;
a pixel value decision section which compares each pixel value extracted by the pixel value extraction section against a previously set first threshold value and makes a decision as to whether the pixel value is less than the first threshold value;
a first autocorrelation coefficient calculation section which finds autocorrelation coefficients of pixel values which are less than the first threshold value and which are possessed by pixels located at the same coordinate point defined by the image data over plural ones of the frames accepted while being shifted at the regular intervals of time in the direction of the time axis;

a random noise decision section which makes a decision as to whether the autocorrelation coefficients found by the first autocorrelation coefficient calculation section are less than a previously set second threshold value and, when the autocorrelation coefficients are judged to be less than the second threshold value, determines that the image data has suffered from deterioration of image quality due to random noise;

a pixel value setting section which, when the pixel value decision section has determined that the pixel values of the pixels are equal to or larger than the first threshold value, sets the pixel values equal to or larger than the first threshold value as a second threshold value;

a second autocorrelation coefficient calculation section which extracts pixel values which are equal to or larger than the second threshold value and which are possessed by pixels located at the same coordinate point over plural ones of the frames accepted while being shifted at the regular intervals of time in the direction of the time axis and finding autocorrelation coefficients of the extracted pixel values;

an autocorrelation coefficient decision section which makes a decision as to whether the autocorrelation coefficients found by the second autocorrelation coefficient calculation section are less than a previously set third threshold value;

a short-distance view selection section which selects pixels possessing pixel values having autocorrelation coefficients less than the third threshold value as pixels of a short-distance view of the image when the autocorrelation coefficients are judged to be less than the third threshold value by the autocorrelation coefficient decision section; and a camera shake correction section which makes a correction for camera shake of the pixels of the short-distance view of the image selected by the short-distance view selection section.

34. An imaging apparatus comprising:

an image sensor;

an optical system for guiding incident light from a subject into the image sensor;

a signal-processing portion for converting an image signal from the image sensor into a digital signal and outputting the converted signal as image data for each frame, the image data including pixel values each having a brightness at a corresponding one of coordinate points arranged in directions of rows and columns; and a random noise decision/reduction processing portion which judges and/or reduces random noise generated by the image sensor;

wherein the random noise decision/reduction processing portion has:

a pixel value extraction section which accepts the image data delivered from the signal-processing portion in turn for each frame while shifting the image data at regular intervals of time in a direction of a time axis and extracts, in each frame, the pixel value represented by the image data accepted in each frame;

a pixel value decision section which compares each pixel value extracted by the pixel value extraction section against a previously set first threshold value and makes a decision as to whether the pixel value is less than the first threshold value;

a first autocorrelation coefficient calculation section which finds autocorrelation coefficients of the pixel values which are less than the first threshold value and which are possessed by the pixels located at the same coordinate point defined by the image data over plural ones of the frames accepted while being shifted at the regular intervals of time in the direction of the time axis; and a random noise decision section which makes a decision as to whether the autocorrelation coefficients found by the first autocorrelation coefficient calculation section are less than a previously set second threshold value and, when the autocorrelation coefficients are judged to be less than the second threshold value, determines that the image data has suffered from deterioration of image quality due to random noise.

* * * * *